Dec. 27, 1955 H. J. SIEKMANN ET AL 2,728,254
TRACER CONTROLLED LATHE STRUCTURE
Filed Nov. 5, 1953 5 Sheets-Sheet 1
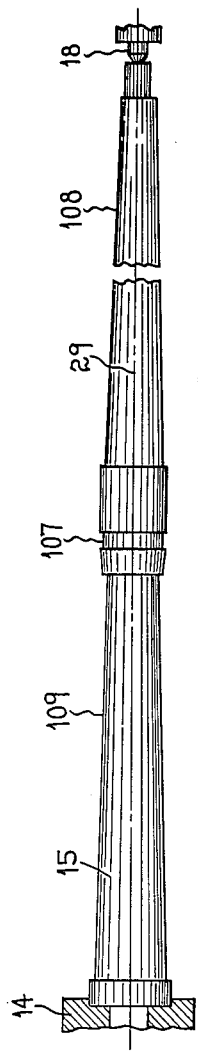
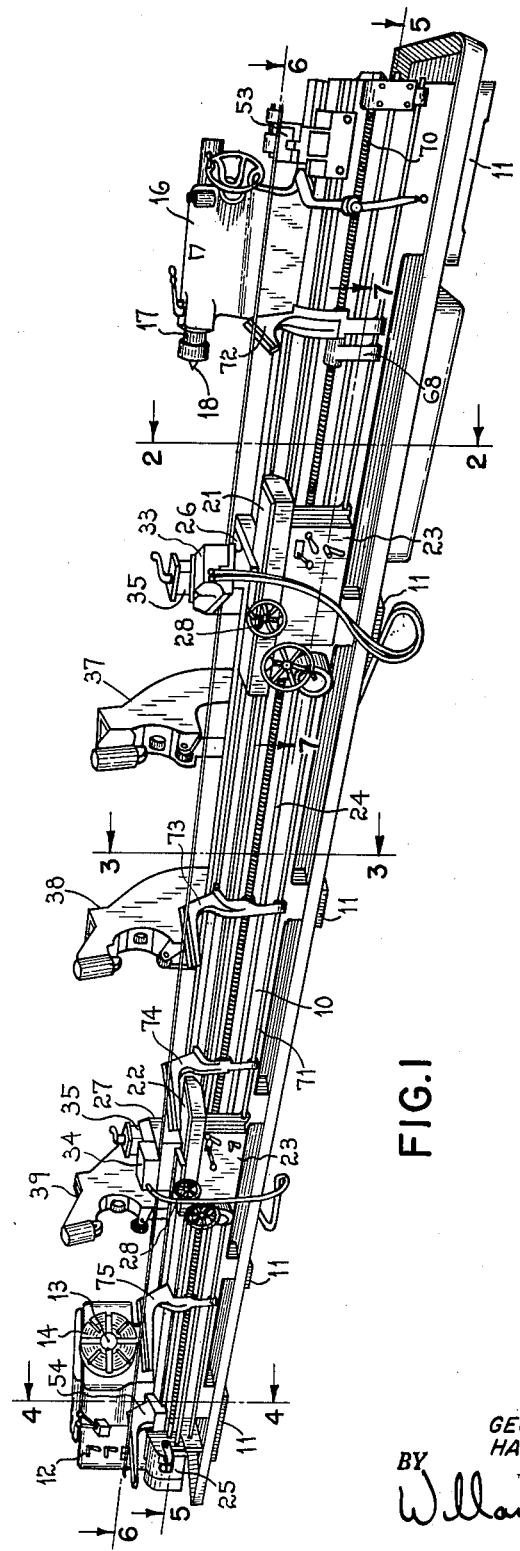
INVENTORS.
GEORGE W. LUNING AND
HAROLD J. SIEKMANN
BY
Willard S. Groen
ATTORNEY.

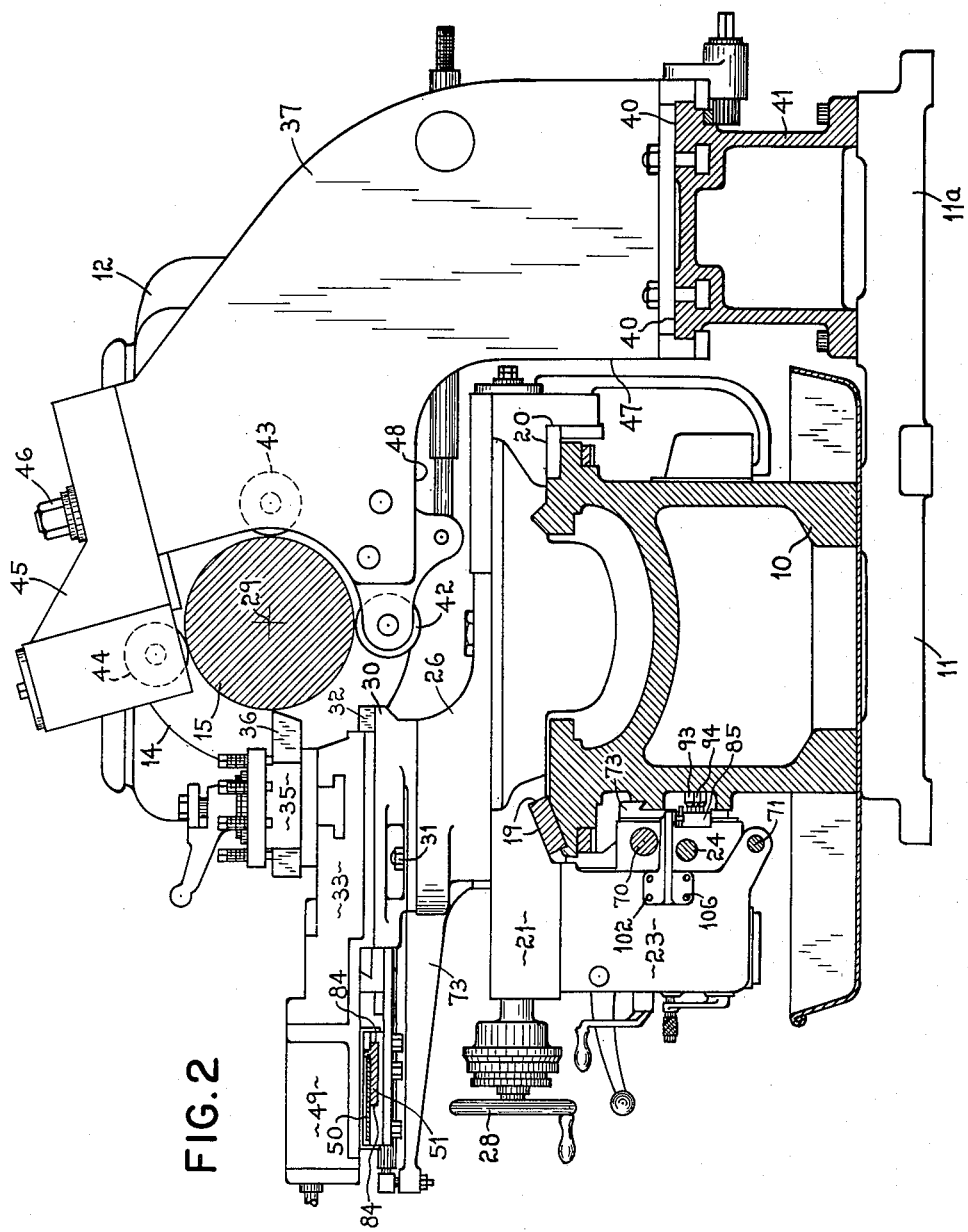

Dec. 27, 1955  H. J. SIEKMANN ET AL  2,728,254
TRACER CONTROLLED LATHE STRUCTURE
Filed Nov. 5, 1953  5 Sheets-Sheet 4

INVENTORS.
GEORGE W. LUNING AND
HAROLD J. SIEKMANN
BY
ATTORNEY.

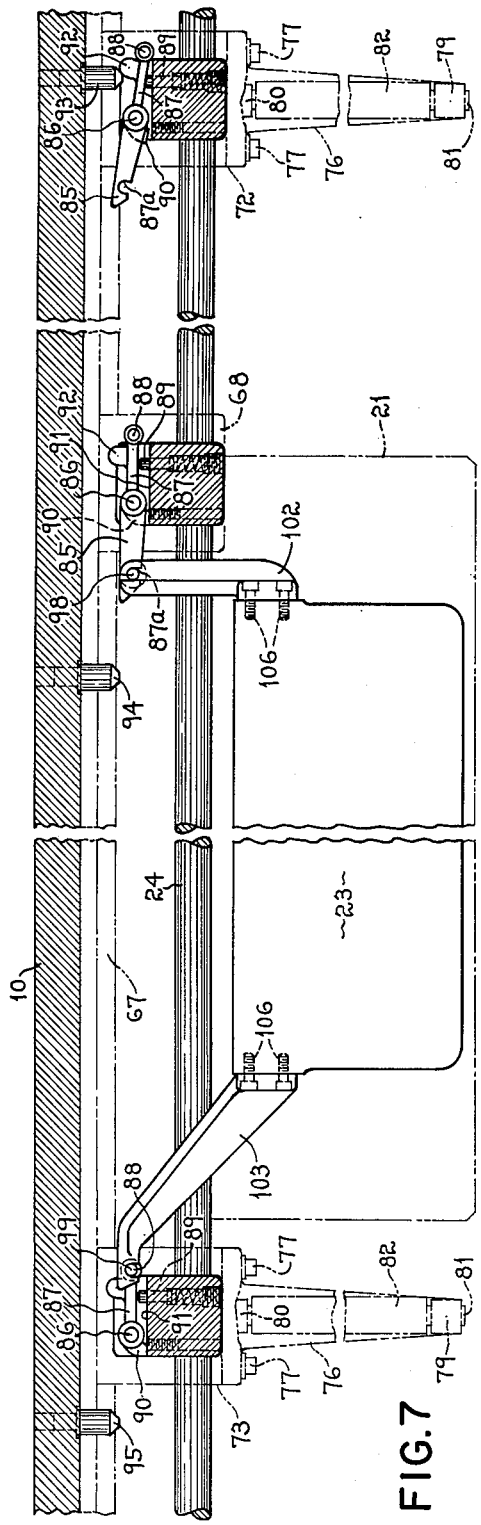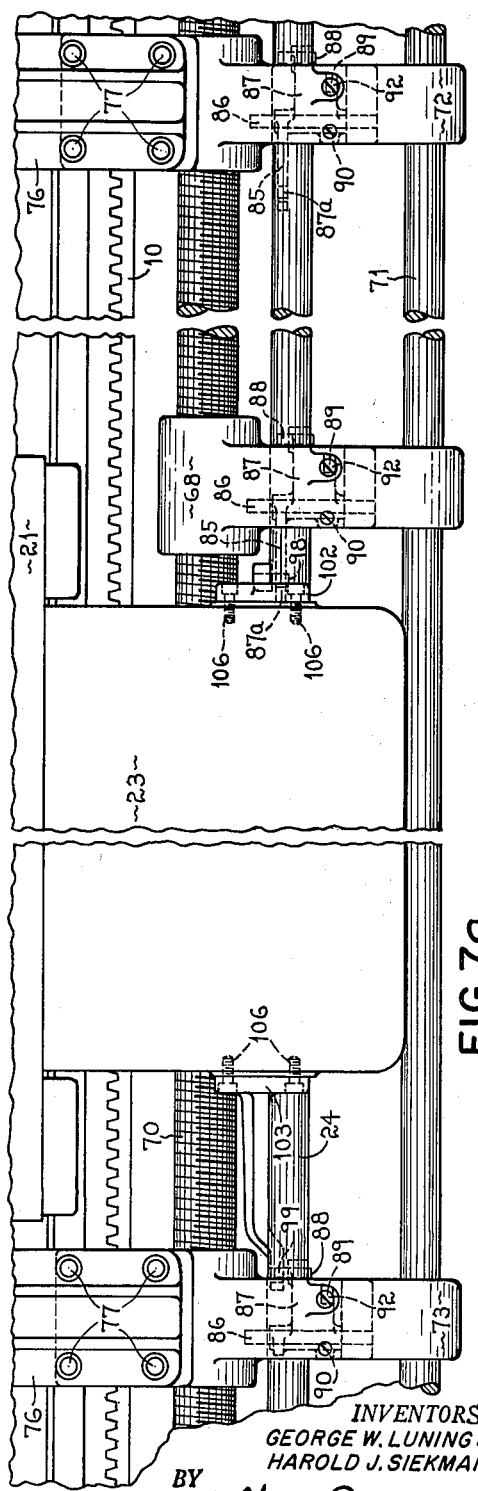

United States Patent Office 2,728,254
Patented Dec. 27, 1955

2,728,254

TRACER CONTROLLED LATHE STRUCTURE

Harold J. Siekmann and George W. Luning, Cincinnati, Ohio, assignors to The R. K. Le Blond Machine Tool Co., Cincinnati, Ohio, a corporation of Delaware Application November 5, 1953, Serial No. 393,163

3 Claims. (Cl. 82—14)

This invention pertains to improvements in tracer controlled lathe structures and is particularly directed to an improved structure to facilitate the automatic machining to contour form of long relatively small diameter work pieces such as guns or the like by a continuous automatic longitudinal feeding movement of the cutting tools without interruption lengthwise of the work piece in the lathe.

One of the primary objects of this invention is to arrange a machine tool structure comprising a lathe in such a manner that a relatively long small diameter work piece may be supported at a plurality of axially spaced positions in the lathe while at the same time enabling one or more tool carriages to feed continuously longitudinally along the entire work piece length and to provide tracer controlled mechanism including a template bar extending longitudinally of the front portion of the lathe to control the contour movement of the tool throughout its entire length of turning cut travel on the work piece.

Still another object of this invention is to provide an improved lathe structure including a bed and steady rest means mounted to the rear of said bed engaging a relatively long small diameter work piece and to provide tool carriage means on the bed movable past the steady rest means and which tool carriages are controlled for contour turning movement by control means located along the front of the bed of the lathe.

Still another object of this invention is to provide an improved tracer controlled lathe structure including a bed, steady rest means mounted on the rear portion of the bed engaging a work piece at spaced axial positions in the lathe and to provide tracer controlled cutting tools moving automatically and continuously along the entire length of said work piece to machine a contoured shape on the work surface with an uninterrupted cut longitudinally of the lathe.

Still another object of this invention is to provide an improved lathe structure including a bed, steady rest means rigidly fixed at spaced axial positions on the rear portion of the bed, tool carriage means movable longitudinally along the bed past said steady rest, together with tracer control template bar means supported on the bed and tool carriages at the front of the bed of the lathe so that a continuous uninterrupted contour control turning cut can be affected by the cutting tools along the entire length of the work piece in the lathe.

Further features and advantages of this invention will appear from a detailed description of the drawings in which:

Fig. 1 is a front perspective view showing the general arrangement of the tracer control lathe structure incorporating the features of this invention.

Fig. 2 is an enlarged transverse section of the machine on the line 2—2 of Fig. 1.

Fig. 7 is an enlarged horizontal fragmentary section on the line 7—7 of Fig. 1.

Fig. 7a is a front elevation partly broken away of the subject matter shown in Fig. 7.

Fig. 8 is a view showing a typical work piece machined in the lathe structure shown in Fig. 1.

Figure 3:
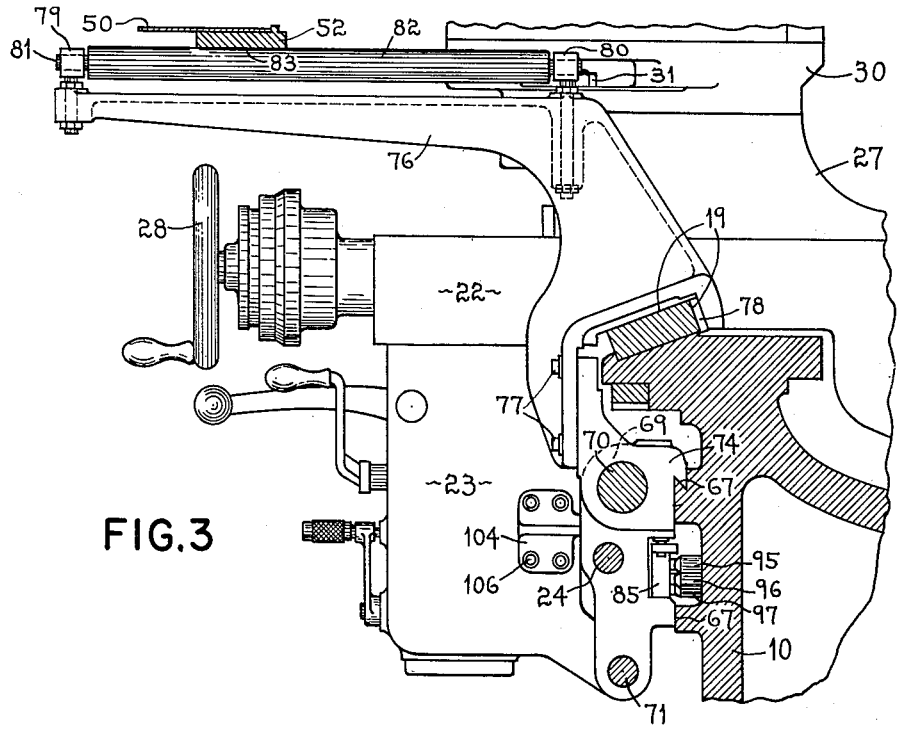
Fig. 3 is an enlarged fragmentary section on the line 3—3 of Fig. 1.

As exemplary of one embodiment of this invention in a tracer controlled lathe structure there is shown a machine having a bed 10 which is supported on suitable legs 11 spaced longitudinally of the bed. Fixed on the bed of the lathe is the usual headstock 12 having the work spindle 13 and a suitable chuck 14 for supporting and rotating a work piece 15. The lathe is usually provided at the opposite end with a suitable tailstock 16 having the barrel 17 and center 18 for supporting the opposite end of the work piece from that of the headstock.

Slidably mounted on the guideways or shears 19 and 20 for longitudinal movement on the bed 10, are the carriages 21 and 22 each of which carriages are provided with suitable aprons 23 driven by the feed rod 24 from the usual feed box 25 driven from the headstock 12 in a well known manner. Slidably mounted for transverse movement on top of the carriages 21 and 22 are the respective cross slides 26 and 27 which are adjustable by the usual cross feed screw hand wheels 28 for transverse adjustment of the cross slides for proper tool depth of cut relative to the spindle axis 29 of the lathe.

Mounted on top of the cross slides 26 and 27 are the respective compound rest lower swivel slides 30 which may be swung around to any desired angular position and clamped to the carriage by suitable clamp bolt means 31. Slidably mounted on suitable guideways 32 on the compound rest swivel slides 30 are the tracer controlled tool slides 33 and 34, each respectively having a suitable tool block 35 and tool 36.

To the rear of the bed 10 and tool carriages 21 and 22 are mounted a series of axially spaced steady rests 37, 38 and 39 each of which is mounted on and longitudinally adjustable on the guideways 40 of the sub-bed or steady rest supporting bed 41, which bed 41 in turn is mounted on rearward extensions 11a of the legs 11 of the lathe structure. Each of the steady rests 37, 38 and 39 are provided with adjustable rollers 42, 43 and 44 arranged to engage and support the work piece 15 mounted in the lathe. Preferably, the upper roller 44 is carried in a bracket 45 which may be released by the clamping nut 46 and swung around to facilitate placement and removal of the work piece 15 in the lathe without disturbing the initial setting of the steady rests on the sub-bed 41. It is most important to note that the steady rest has an inwardly upwardly extending surface 47 which terminates in an overhanging horizontal surface 48 extending forwardly over the top of the cross slides and carriages of the lathe so that these carriages may readily feed uninterruptedly past any of the steady rests 37, 38 and 39 to provide a continuous turning cut of longitudinal movement of the tool 36 over the surface of the work piece 15 in the lathe.

Figure 4:
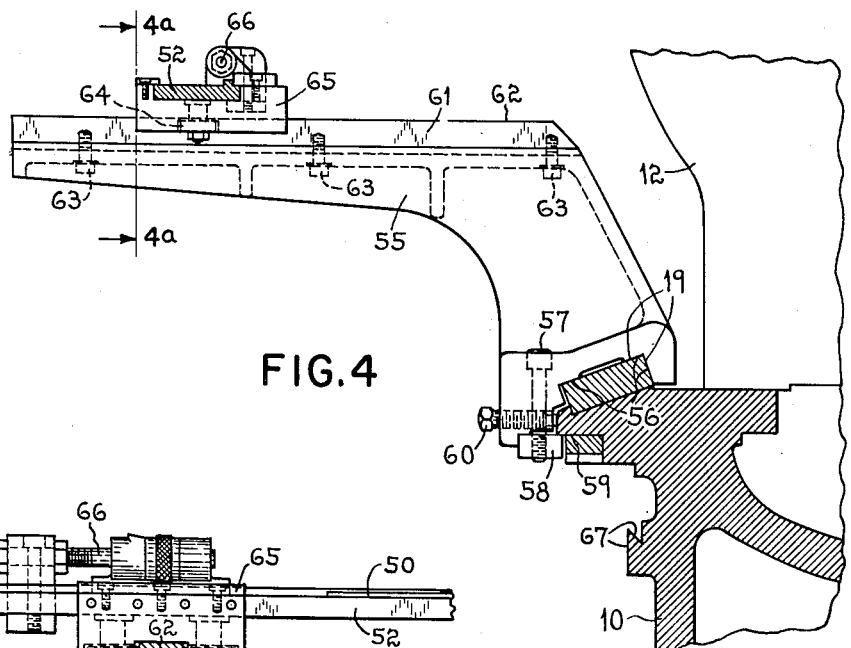
Fig. 4 is an enlarged fragmentary section on the line 4—4 of Fig. 1.

On the front of the lathe is mounted the tracer control apparatus for the tool slides 33 and 34. Each of these mechanisms may include a suitable actuator such as the fluid pressure cylinder 49 controlled by a suitable tracer finger from a template 50 mounted on the template bars 51 and 52 respectively for the tool slides 33 and 34 in a manner, for example, as shown in Patent 2,587,542, issued February 26, 1952. The template bars 51 and 52 are slidably supported for relative longitudinal movement of the carriages along the bed 10 by suitable guideways formed in the compound rest swivel slides 30, in a manner as set forth in said patent. Each of the template bars 51 and 52 are supported at one end against relative longitudinal movement of the bed 10 by the end fixed support brackets best shown in Fig. 4. Each of these brackets marked 53 and 54, Fig. 6, for the respective template bars 51 and 52 comprise a main bracket casting 55 having abutment surfaces 56 engaging the front shear or guideway 19 of the bed, said abutments 56 being held in rigid engagement with the guideways 19 by the clamp bolt 57 having a clamping gib 58 engaging the under surface 59 of the bed 10 and the clamping screw 60 engaging the side of the bed. The bracket castings 55 can therefore be rigidly clamped in any desired spaced axial position on the bed of the machine and locked thereon during the normal operation of the lathe.

Figure 4A:
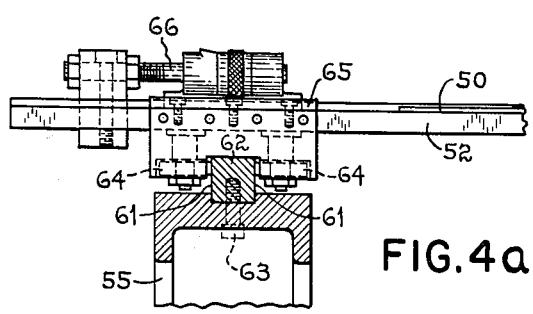
Fig. 4a is an enlarged fragmentary section on the line 4a—4a of Fig. 4.
Figure 5:
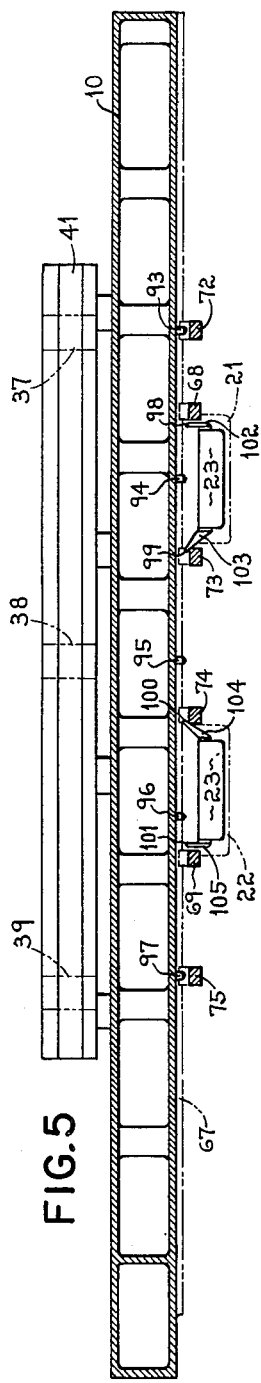
Fig. 5 is a horizontal section on the line 5—5 of Fig. 1.

Suitable transverse guideways 61 formed on each side of the bar 62 rigidly secured to the bracket casting 55 by suitable screws 63 are engaged by the contact rollers 64 of the transversely movable guide shoe 65 which is connected through a longitudinal micrometer adjusting screw 66 to the template bar 51 or 52, as best seen in Fig. 4a. Thus, by the arrangement of Figs. 4 and 4a the outer end of the template bars 51 and 52 are held against longitudinal movement with regard to the bed while the carriages and tool slides move relative thereto along the bed, they are at the same time permitted transverse movement by the rollers 64 on the guideway 61 of the bar 62 for in and out depth of cut adjustment as affected by the cross feed hand wheel 28 for the cross slides of the lathe. Such an arrangement is shown, for example, in Patent 2,559,138 of July 3, 1951.

Figure 6:
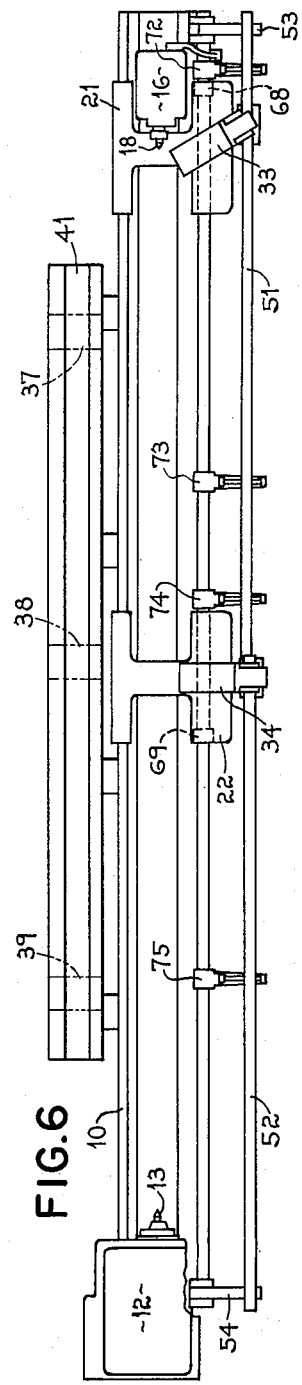
Fig. 6 is a horizontal section on the line 6—6 of Fig. 1 showing the tool cutting carriages at the beginning of the cutting cycle.

Referring particularly to Figs. 3 and 6, along the front of the bed 10 is formed the longitudinal guideways 67 upon which are slidably mounted the support members 68 and 69 for the lead screw 70, the feed rod 24 and the apron spindle control rod 71. The combined supports 72, 73, 74 and 75 not only support the lead screw 70, the feed rod 24 and the apron spindle control rod 71 but also serve to support the template bars 51 and 52. Each of these combination supports for the lead screw and rods of the lathe and the template bars is constructed as best shown in Fig. 3 and comprises the support casting 76 which is rigidly secured by suitable bolts 77 to the lead screw and rod supporting portion sliding on the guideway 64 of the bed. The support casting 76 also has a contact shoe 78 engaging the inner guideway 19 of the front shear of the bed. On the upper portion of the support casting there is provided eye bolts 79 and 80 which support a shaft 81 upon which is journaled a roller 82 engaging the under side 83 of the respective template bar 51 or 52. By this construction the template bars are supported so that they may slide readily axially of the rollers 82 and further, that the brackets 76 may move longitudinally of the template bars with minimum frictional resistance therebetween while at the same time properly supporting the template bars in accurate horizontal position relative to the end brackets 53 and 54 and the guideway supports 84 on the swivel slides 30.

Each of the supports 68, 69, 72, 73, 74 and 75 are automatically longitudinally positioned on the guideways 67 of the bed 10 for properly supporting the various lead screws, control rods and template bars as the tool carriages 21 and 22 feed along in cutting operation on the work piece and in returning back to the original starting position. To this end there is provided latch and trip mechanism in each of said supports comprising a lever having a latch arm 85, Fig. 7, pivotally mounted on a suitable pin 86 fixed to the respective support and having a latch slot 87a formed in the outer end of the latch arm 85. A trip pin arm 87 formed integral with the latch arm 85 has a latch or trip pin 88 fixed in its outer end. A spring-urged plunger 89 slidably mounted in each of the supports engages the tip pin arm 87 to swing it outwardly around the pivot pin 86 normally up against an abutment lug 90 on the latch arm 85 which engages the surface 91 on the support. A trip lug 92 is adapted to be engaged by a series of trip pins 93, 94, 95, 96 and 97 appropriately fixed in the front face of the bed 10 of the lathe so as to rock the trip pin arm 87 in opposition to the spring-urged plunger 89 so as to release the trip pin arm slot 87a from trip pins 88 in other trip pin arms 87 or the trip pins 98 and 100 in the brackets 102 and 104 fixed to the aprons 23 by screws 106, or to release the latch or trip pins 88 from lever arms 87 from slots 99 and 101 in the respective brackets 103 and 105 fixed to the aprons 23.

In the operation of the machine the work piece 15 is gripped in the chuck 14 and supported on the tailstock center 18 and a light cut or spot 107 is turned on the work piece. The steady rest 39, the only one used on this particular exemplary piece of work is then carefully adjusted to rigidly rotatively support the work piece 15 intermediate the chuck 14 and the center 18. The problem now is to contour turn the entire surface 108 and 109 by a continuous feeding of the carriages and tools longitudinally of the axis 29 of the lathe without interrupting the cut or resetting or adjusting the steady rests 39 in any manner whatsoever. Further, it is essential that the template bars be maintained in proper operative position automatically during this entire continuous operation.

The beginning of the cutting operation on a work piece such as shown, for example in Fig. 8, the carriages 21 and 22 are positioned as shown in Fig. 6 with the lead screw and rod support 68 latched in to the bracket 102 on the apron of the carriage 21 and also the combination template bar support bracket also latched in to the pin 88 by means of the slot 87a of this bracket 72 with the support bracket 68. Under these conditions the supports 68 and 72 will move initially in unison with the movement of the apron and carriage 21. The support 73 is positioned at an intermediate location toward the outer free end of the template bar 51 as best seen in Fig. 6.

The support 74 is latched in to the bracket 104 of the carriage 22 while the regular support 69 is likewise attached to and pushed along by the apron of the carriage 22 at the initial feeding cycle. The combination support 75 is positioned at this time at an intermediate point between the starting point of the carriage 22 and the end support 54 for the template bar 52.

Figure 6A:
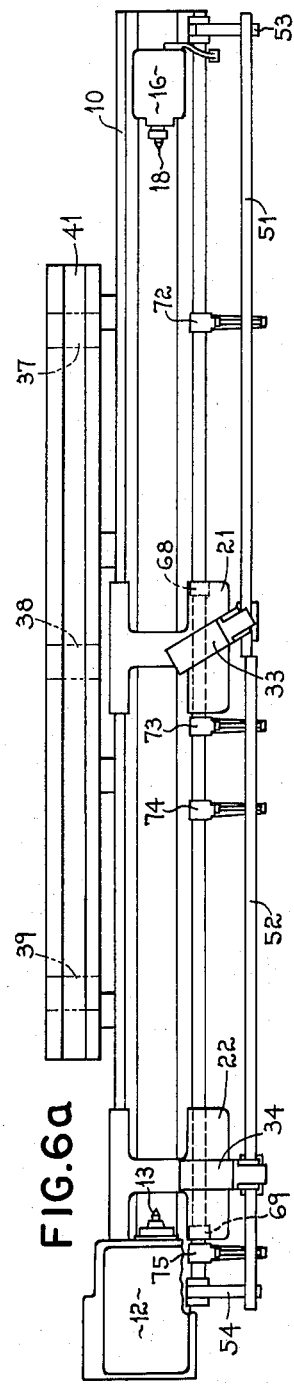
Fig. 6a is a section similar to Fig. 6 but showing the cutting tools at the conclusion of the machining cycle.

Power feed is then applied simultaneously to both carriages so that they feed in unison simultaneously longitudinally of the bed toward the headstock in this particular instance. The template bars being held by their respective end support brackets 53 and 54 therefore have relative longitudinal movement to the carriages. In other words, the tracer controlled tool slides are moved along the templates on the template bars 51 and 52 to move the tool under contour control operation in and out relative to the axis 29 of the work piece 15 to perform the contour turning operations on the portions 108 and 109 of the work piece 15. As the carriage 21 reaches an intermediate position of its travel the trip pin 93 on the bed releases support 72 and strands it at the intermediate point shown in Fig. 6a. In this particular arrangement the ordinary support bracket 68 continues latched in with carriage 21 and its apron. The carriage 22 has latched to it bracket 74 which it releases through a trip pin 97 on the bed at the position shown in Fig. 6a and continues on toward the headstock pushing along in latched up condition the support 69 and the combination support 75. Meanwhile, the combination support 73 has been latched into and pushed along by the carriage 21 to the point shown at 73 in Fig. 6a.

The return procedure results in the repositioning of the various supports in the manner shown in Fig. 6 through the operation of the trip pins on the bed and the latching means described and shown in Figs. 7 and 8. Thus, supports are automatically provided at proper locations along the length of the template bars 51 and 52 automatically with a continuous feeding operation of the carriages along the bed of the lathe. It is to be further noted that the steady rest or rests, depending upon how many are used, in no wise interfere with the free movement of the carriage past the steady rest so that the cuts can be matched up automatically with the pre-turn spot 107 on the work piece 15 and continue on beyond to do further turning from position 108 to position 109, Fig. 8, if desired. Thus we have a novel tracer controlled lathe structure in which a plurality of carriages operate simultaneously past a plurality of steady rests while performing a tracer controlled operation having a template bar or bars mounted at the front of the lathe, with a steady rest at the rear of the lathe, and in which automatic means are provided for supporting the template bars at spaced intervals and predetermined positions automatically by the relative movement of the carriages in performing the machining and return operation.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a tracer controlled lathe structure, a bed, a carriage movable longitudinally on said bed, a steady rest fixed to the rear of said bed and extending forwardly over said bed and carriage, a tracer actuated tool slide on said carriage, a template bar having a template to actuate said tool slide, a support fixed on said bed for one end of said template bar to prevent relative longitudinal movement of said template bar and said bed, a support on said tool slide allowing relative longitudinal movement of said carriage and said template bar, further support means on said bed for intermediate portions of said template bar located between said fixed support and the support on said carriage, means on said carriage to engage and move said further support means along said bed, and trip means on said bed to disconnect said further support means from said carriage to automatically position said further support means at preedtermined positions along said bed.

2. In a tracer controlled lathe structure, a bed, a headstock on said bed, a tailstock on said bed, steady rest means rigidly fixed relative to said bed, a work engaging portion on said steady rest means extending forwardly over the bed of said lathe, carriage means movable on said bed past said steady rest means, tool slide means on said carriage means, tracer actuated means for controlling the movement of said tool slide means, template bar means including a template located along the front of said bed, a support fixed to said bed engaging one end of said template bar means, a support on said carriage means engaging another portion of said template bar means, intermediate movable support means on said bed adapted to engage said template bar between said support fixed to the bed and said support on said carriage, lead screw, feed rod, and apron spindle control rod and said lathe structure, and support means on said intermediate movable support means engaging said lead screw, feed rod, and apron spindle control rod.

3. In a tracer controlled lathe structure, a bed, a headstock on said bed, a tailstock on said bed, steady rest means rigidly fixed relative to said bed, a work engaging portion on said steady rest means extending forwardly over the bed of said lathe, carriage means movable on said bed past said steady rest means, tool slide means on said carriage means, tracer actuated means for controlling the movement of said tool slide means, template bar means including a template located along the front of said bed, a support fixed to said bed engaging one end of said template bar means, a support on said carriage means engaging another portion of said template bar means, intermediate movable support means on said bed adapted to engage said template bar between said support fixed to the bed and said support on said carriage, lead screw, feed rod, and apron spindle control rod on said lathe structure, support means on said intermediate movable support means engaging said lead screw, feed rod, and apron spindle control rod, means on said carriage means for moving said intermediate support means by the movement of said carriage means, and trip pin means on said bed to disengage said intermediate support means from movement by said carriage means and automatically position said support means on said bed at predetermined intermediate positions of said template bar, lead screw, feed rod, and apron spindle control rod.

References Cited in the file of this patent

UNITED STATES PATENTS

| Number | Name | Date |
|---|---|---|
| 804,131 | Johnson | Nov. 7, 1905 |
| 1,523,310 | Sundstrand | Jan. 13, 1925 |
| 2,314,250 | Smith | Mar. 16, 1943 |
| 2,494,196 | Pesqueira | Jan. 10, 1950 |
| 2,526,487 | Kurzweil | Oct. 17, 1950 |
| 2,587,542 | Siekmann | Feb. 26, 1952 |
| 2,612,070 | Hoelscher | Sept. 30, 1952 |

FOREIGN PATENTS

| 488,484 | France | Oct. 15, 1918 |